4 Sheets—Sheet 1.
T. A. EDISON.
QUADRUPLEX TELEGRAPH.
No. 420,594. Patented Feb. 4, 1890.
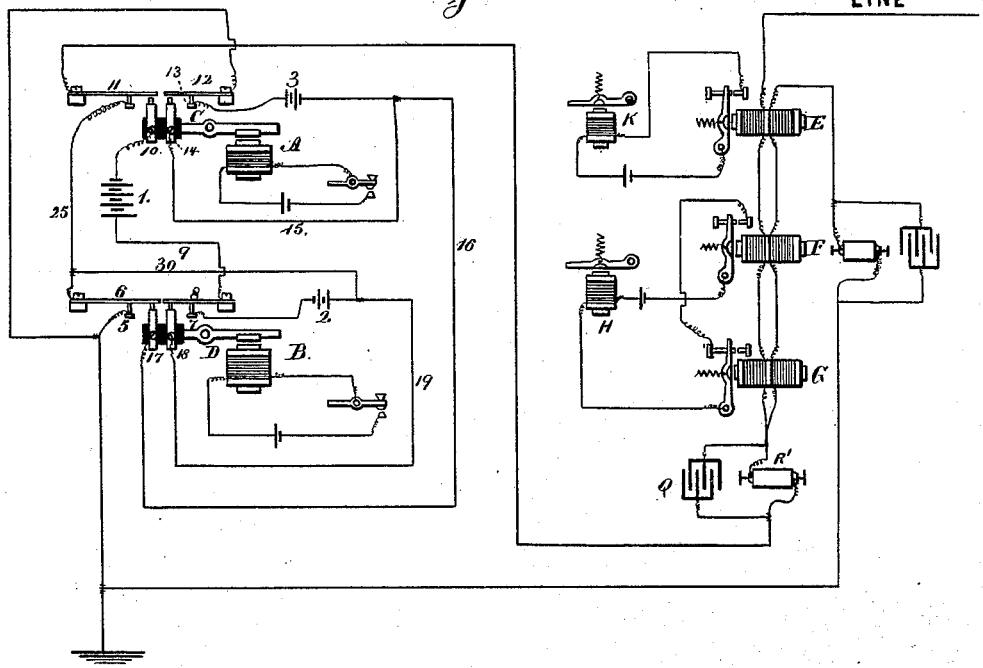
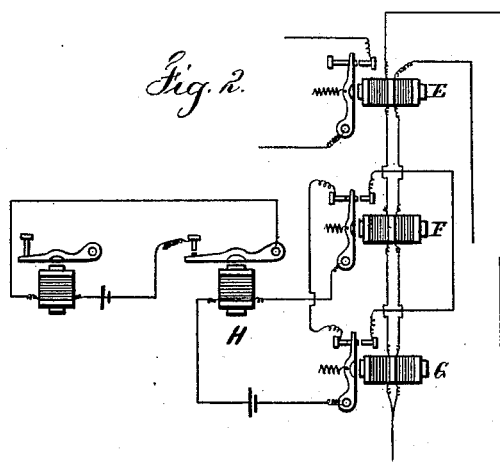
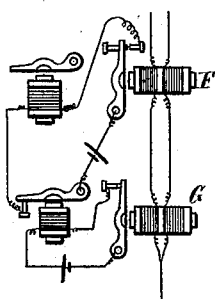
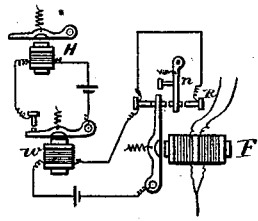
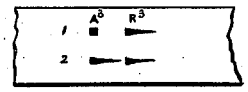
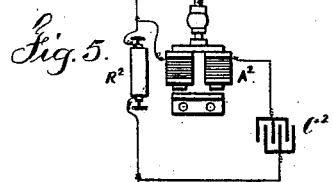
Witnesses
Chas H. Smith
William G. Mott
Inventor
Thomas A. Edison
per Lemuel W. Serrell
atty.

4 Sheets—Sheet 2.
T. A. EDISON.
QUADRUPLEX TELEGRAPH.
No. 420,594. Patented Feb. 4, 1890.
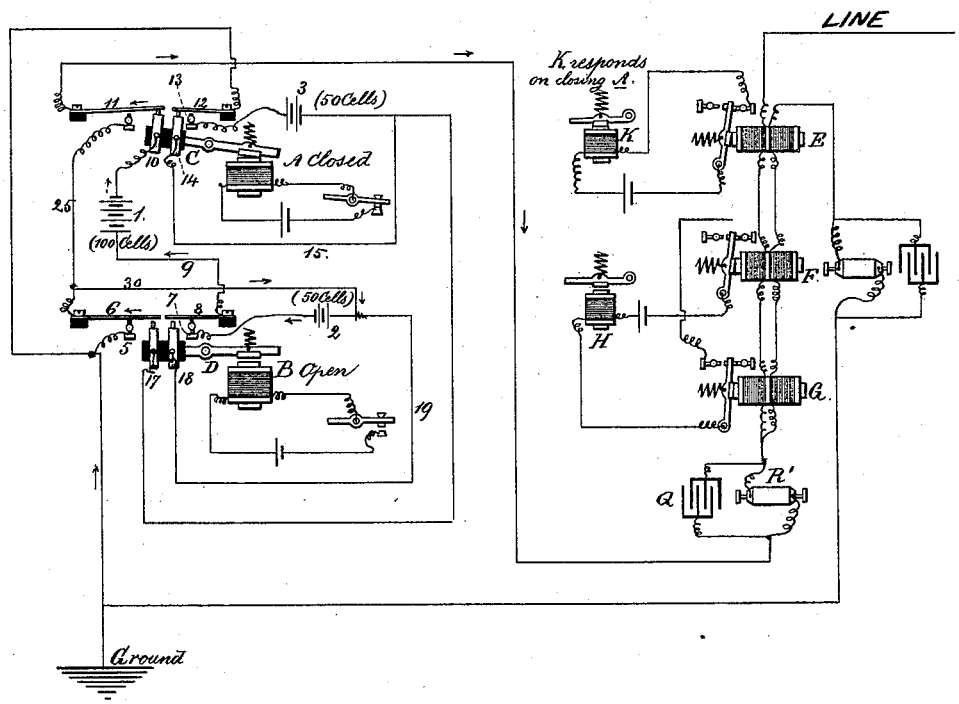

4 Sheets—Sheet 3.
T. A. EDISON.
QUADRUPLEX TELEGRAPH.
No. 420,594.          Patented Feb. 4, 1890.
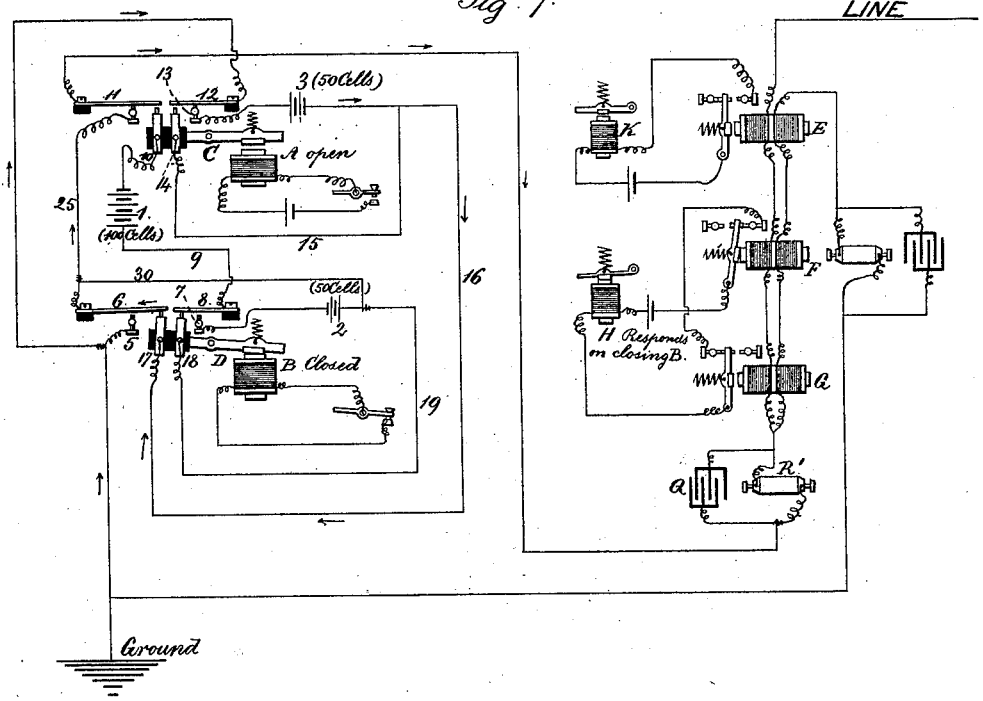

4 Sheets—Sheet 4.
T. A. EDISON.
QUADRUPLEX TELEGRAPH.
No. 420,594.        Patented Feb. 4, 1890.
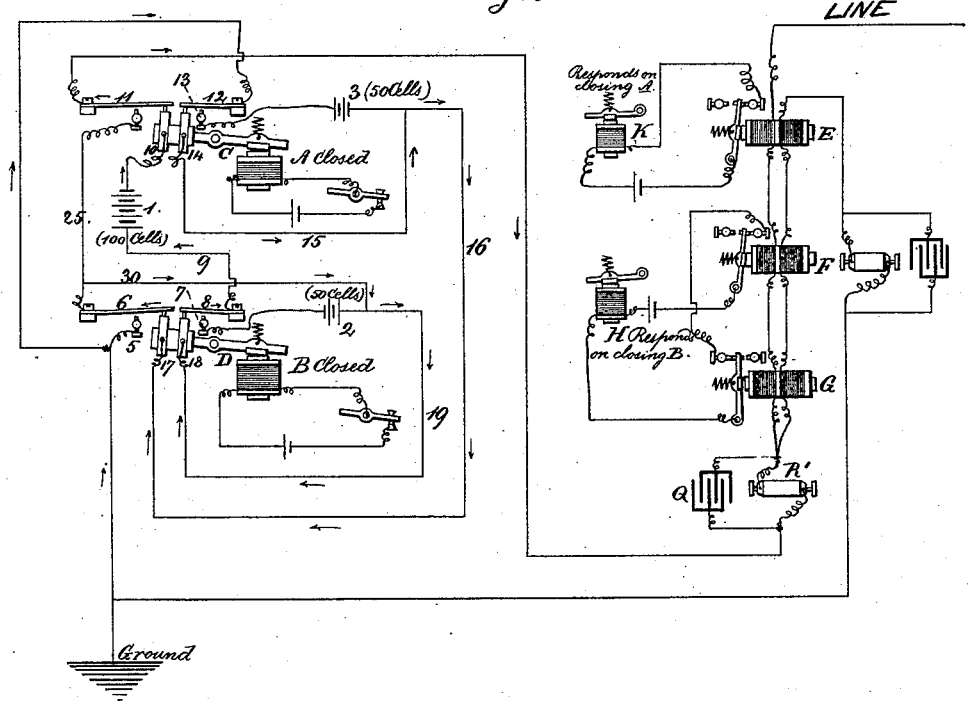

UNITED STATES PATENT OFFICE.

THOMAS A. EDISON, OF MENLO PARK, NEW JERSEY, ASSIGNOR TO THE WESTERN UNION TELEGRAPH COMPANY, OF NEW YORK, N. Y.

QUADRUPLEX TELEGRAPH.

SPECIFICATION forming part of Letters Patent No. 420,594, dated February 4, 1890.

Application filed August 22, 1877. (No model.)

*To all whom it may concern:*

Be it known that I, THOMAS A. EDISON, of Menlo Park, in the county of Middlesex and State of New Jersey, have invented an Improvement in Quadruplex Telegraphs, of which the following is a specification.

The object of this invention is to transmit and receive four independent messages over a single wire at the same time without interference with each other, two in one direction and two in the opposite direction.

This invention relates to the combination, with transmitting-keys that apply more or less battery power, of three differential receiving-magnets and their armatures and two sounders, and circuit-connections, as hereinafter specified, whereby one sounder is operated by a force of a strength, say, of one hundred or of one hundred and fifty, and the other sounder is operated when the current is of one of two different strengths—say fifty or one hundred—but not by a current represented by one hundred and fifty.

Figure 1 is a diagram of the circuit-connections, keys, and receiving-instruments. Figs. 2, 3, and 4 show modifications of the receiving-instruments. Fig. 5 shows the device for regulating the charging and discharging of the artificial line. Fig. 6 is a diagram like Fig. 1, but with the key A closed. Fig. 7 is a similar diagram with the key B closed. Fig. 8 is a similar diagram with both keys A and B closed. Fig. 6ª represents a piece of chemical paper with marks thereon, as hereinafter explained.

For convenience the receiving-instruments are represented as responding to the respective keys. It is, however, to be understood that the receiving-instruments respond to the incoming current from the distant keys, and not to the outgoing current, because the helices are wound differentially in the line and artificial lines, respectively, for quadruplex transmission and reception.

The action and manipulation of the transmitters A and B, Fig. 1, are similar to the transmitters A and B shown in my application No. 139, filed June 2, 1877, official number 85/9. The construction slightly differs in this respect: that the double levers of Case No. 139 are dispensed with, and two small contact-points are secured to an insulating-block upon the extreme end of each single transmitting-lever C and D. The present, however, it will be seen, is a quadruplex instrument, and has no key to reverse the polarity, and the circuits are also arranged differently to that extent.

All the receiving-instruments are wound with double coils, and are placed in the main-line and artificial circuit. The receiving-instrument E is of the ordinary character, and is adjusted to respond only to currents, say, of one hundred or one hundred and fifty, but not to fifty. The relay F responds to a strength of fifty, while the relay G only responds to a strength of one hundred and fifty.

The signals are made as follows: The spring of relay E allows the armature to move by a force of one hundred, or nearly so; hence the closing-signal on the sounder K is made with a current strength of either one hundred or one hundred and fifty. The local circuit of K remains open either by no current or fifty. The closing-signal on the sounder H is made with a current strength of fifty or one hundred, and the opening-signal by a current strength either of one hundred and fifty or nothing. When both keys A and B are open, there is no battery on the line, but the line is complete through 5, 6, 25, and 11. When key A is closed, the circuit is through 5 6, battery 2, point 7, spring 8, wire 9, battery 1, point 10, and spring 11 to line, thus placing on line the powers of batteries 1 and 2—say one hundred plus fifty equals one hundred and fifty—and the receiving-instrument E is adapted, as aforesaid, to respond to the battery-power of one hundred or one hundred and fifty, as hereinafter explained. Now, if key B is closed while A remains closed, the circuit is from earth through 12 14 15 16 17 6 30 19 18 8 9 1 10 11 to line; hence battery 2 is cut out and only power of one hundred remains on line, but that is enough to still operate the sounder K. The power of one hundred only being obtained when both keys are closed, the sounder H also responds to the said power of one hundred; but if key A is opened and B closed the circuit is through 12, 13, 3, 16, 17, 6, 25, and 11 to line, thus putting on only the battery 3, (equals fifty,) so that the sounder H responds by closing at fifty, as aforesaid; but there is no signal in K.

The method of manipulating the sounder K is obvious and requires no explanation.

The difficult problem is to manipulate the sounder H so as to prevent a mutilation of the signals by the message being received on E and H. I obviate this to a great extent on long lines, and perfectly on short lines, by employing the relays F and G.

When no current is on the line, the levers of both F and G are drawn away by their retractile springs, and the circuit is broken by the lever of F. If now a closing-signal is made, the lever of F is attracted, and as the lever of G remains in contact with its back point the sounder H closes. While thus closed, if a closing-signal is sent by the other operator the current is increased to one hundred and the lever of G still remains at its back point. If while the relay E is closed the operator of F G desires to open, the current is increased to one hundred and fifty, and this has sufficient power to attract the lever of G, thus opening the local circuit at its back point.

Figs. 2 and 3 show modifications of the same device which are preferable on long lines. Figs. 2 and 3 illustrate slight variations in the connections of the relay-magnets operated by the magnets F and G. These are adjusted to respond to the currents in a manner similar to that shown in Fig. 1.

Fig. 4 is another modification, one of the relays being dispensed with and a centralized lever used. The operation of this modification is as follows: When a closing-signal on H is to be made, fifty cells are put to line, and the lever of F is attracted to the lever $n$, where it remains. This breaks the local circuit of the repeating sounder, and the lever of this closes the sounder H. If now the other operator closes, the current is increased to one hundred; but this does not give power enough to the magnet F to overcome the tension on the lever $n$, and the sounder H still remains closed. If while the second operator keeps the circuit still closed it is desired to open H, the current is increased to one hundred and fifty, and this causes F to attract the lever with sufficient power to overcome the spring of the lever $n$, and the repeating-sounder $w$ is closed at R, and this in its turn opens H.

Fig. 5 shows the device for regulating the charging and discharging time of the artificial line. $R^2$ is the resistance forming the artificial balancing or equating line. $C^2$ is the condenser, which shunts it. The improvement consists in inserting an electro-magnet $A^2$ in the condenser shunt-wire, which by suitable adjusting devices is made to approach or recede from a fixed block of iron.

In Fig. 6ª the top line 1 shows the chemical record of the discharge from the regular line and artificial line when the magnet $A^2$ is not in circuit. $A^3$, Fig. 6ª, is the condenser-discharge, while $R^3$ is the discharge from the line, the latter being attenuated or elongated, which is due to the fact that it must discharge through a long resistance, which of itself is capable of being recharged, while the condenser of the artificial line discharges instantly through a circuit formed by the receiving-instrument only; but if the magnet $A^2$, Fig. 5, be inserted this discharge is elongated by meeting the self-induced charge of the magnet itself and the record upon the chemical paper is made, as shown in line 2 of Fig. 6ª. The great convenience of this arrangement for controlling the discharging time of the balancing condenser lies in the fact that by simply adjusting the magnet to or from the block of iron the condenser can be accurately made to equal in strength and discharging and charging time of that of the static current of the line.

R', Fig. 1, is a resistance of three hundred or four hundred ohms shunted with a condenser Q of several microfarads capacity, and the object of its insertion here is to cause by its induced currents a more perfect compensation for the effect of the static charge at the distant station by causing the signals to be re-enforced.

In my application, No. 139, filed June 2, 1877, I have shown some parts that are similar to those represented herein; but they are there combined with a reversing-key and used in a sextuplex telegraph, and in my applications, Nos. 138, 139, and 140, filed June 2, 1877, official numbers 85/8, 85/9, and 85/10, I have represented three electro-magnets in the main line at the receiving-instruments. I therefore herein disclaim such devices.

I claim as my invention—

1. The combination, with the circuit-preserving keys A and B, of the battery 3 and local circuit passing through the contacts of the key A, the battery 2 and local circuit passing through the contacts of the key B, the battery 1 and local circuit passing to the contacts of the keys A and B, and the circuit-connections between the respective keys and the line and earth, substantially as specified, whereby there is always a closed circuit, but no battery to line when the keys A and B are open, and when the key A is closed the maximum battery-power is placed on the line, and when the key B is closed the minimum battery-power is put to line, and when A and B are both closed an intermediate or medium battery-power is placed on the line, substantially as set forth.

2. The combination, in a quadruplex telegraph, of two circuit-preserving keys A and B, the battery 3 and local circuit passing through the contacts of the key A, the battery 2 and local circuit passing through the contacts of the key B, the battery 1 and local circuits passing to the contacts of the keys A and B, and the circuit-connections between the respective keys and the line and earth, and a receiving-instrument having a differentially-wound magnet and an armature set to respond to currents of medium and maximum strength, and a sounder and local circuit including such armature, and a second receiving-instrument having a differentially-wound electro-magnet and an armature adjusted to respond to currents of medium and minimum strength, and a sounder and local circuit-connections passing through such armature, substantially as set forth.

3. The combination, in a quadruplex telegraph, of an electro-magnet in the main-line circuit and an armature set to respond to maximum and medium strengths of current and a sounder brought into action by such armature, a second electro-magnet in the main-line circuit, and an armature set to respond to medium and minimum strengths of currents, and a sounder and local circuit brought into action by such armature, substantially as set forth.

4. In a quadruplex telegraph, the differentially-wound electro-magnets E F G in the main-line circuit, the armatures of such magnets set to respond to different strengths of current, the sounder K and local circuit through the armature of the magnet E, and the sounder and local circuit-connections to the armatures of the two magnets F G, substantially as set forth, for causing such sounder to respond to the low-tension transmitting-key, substantially as set forth.

Signed by me this 16th day of August, A. D. 1877.

THOS. A. EDISON.

Witnesses:
 HAROLD SERRELL,
 WILLIAM G. MOTT.